Nov. 17, 1925.
G. BOJNER
1,561,636
METHOD OF AND MEANS FOR TREATING LIQUIDS BY HEAT
Filed Feb. 11, 1924 2 Sheets-Sheet 1
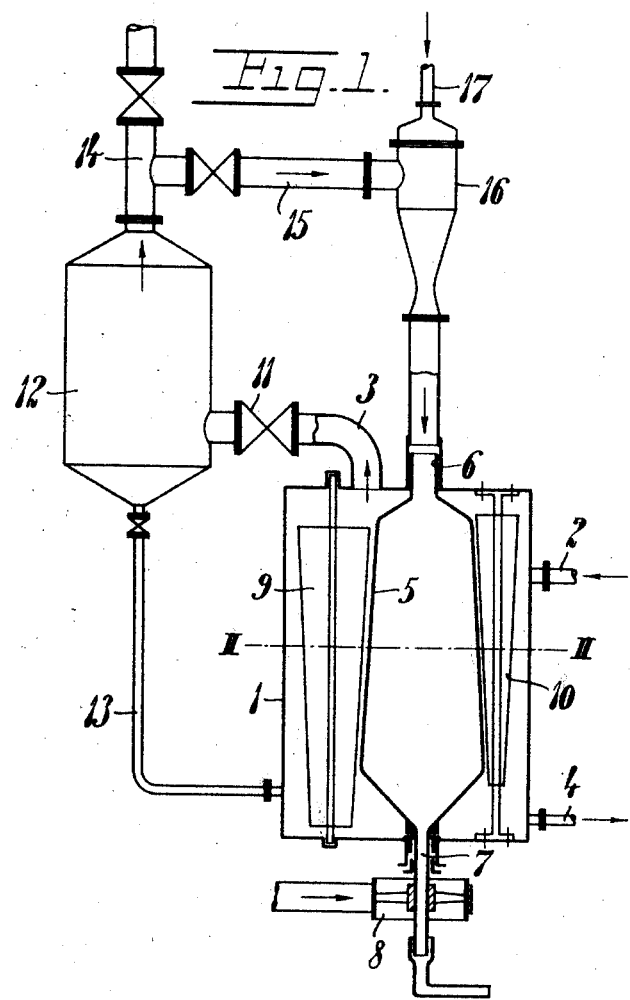
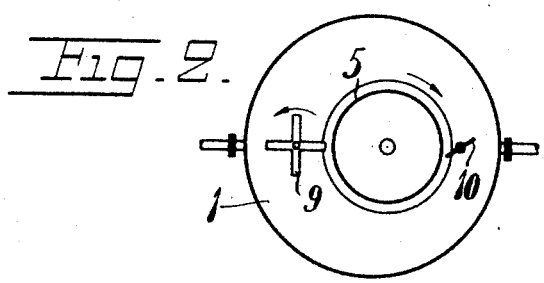

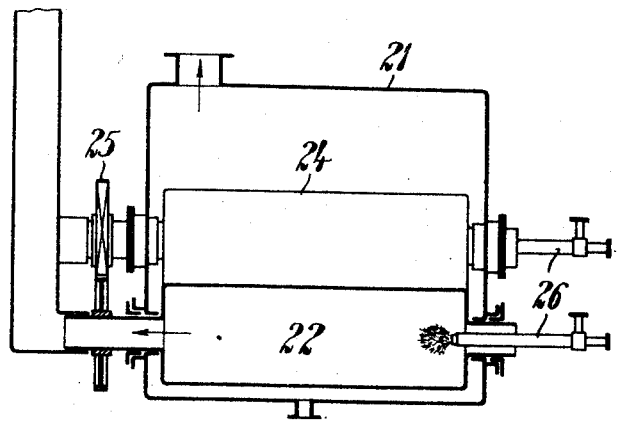
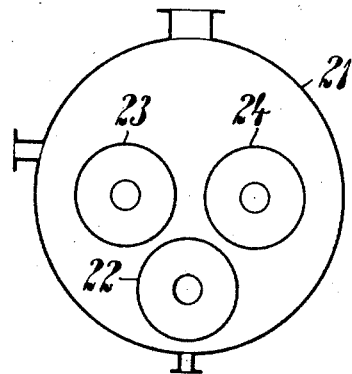

Patented Nov. 17, 1925.

1,561,636

UNITED STATES PATENT OFFICE.

GUSTAV BOJNER, OF KARLSTAD, SWEDEN.

METHOD OF AND MEANS FOR TREATING LIQUIDS BY HEAT.

Application filed February 11, 1924. Serial No. 692,162.

*To all whom it may concern:*

Be it known that I, GUSTAV BOJNER, a citizen of the Kingdom of Sweden, residing at Karlstad, Sweden, have invented new and useful Improvements in Methods of and Means for Treating Liquids by Heat, of which the following is a specification.

This invention relates to a method of and means for treating liquids, and has for its object to provide improved method and means of said kind, particularly for vaporizing or heating liquids or solutions or for generating steam.

In effecting evaporation or concentration of different kinds of liquids, solutions or the like upon the lines hitherto followed the heating element which commonly comprises pipes or tubes will easily be covered with crusts. Such crusts will deposit on the surface of the heating element in contact with the liquid to be vaporized, and will form an insulating coat thereon highly interfering with the heat transmission. The removal of said covering is difficult due to the hardness and close adhering of the coat.

According to this invention the heating body is caused to rotate within the liquid to be vaporized or converted into steam, at a speed sufficiently high to prevent or considerably suppress the formation of crusts on the heating surface. In carrying this method into effect, I may use a very high difference of temperature between the heating medium and the liquid to be vaporized whereby a high efficiency is obtained.

The above said and other features of the present invention will be more specifically described with reference to the accompanying drawing in which, Figure 1 is an elevation, partly in section, of an apparatus for carrying out the method according to this invention. Fig. 2 is a horizontal section on the line II—II, Fig. 1. Fig. 3 is a longitudinal section of a modified design of apparatus, and Fig. 4 is a cross section of said last-mentioned apparatus.

Referring to Figs. 1 and 2 of the drawing, 1 is an appropriate type of receptacle, as a vertical cylinder, adapted to receive the liquid to be vaporized. The receptacle 1 is provided near its top with an inlet 2 for liquid and on its top with an outlet 3 through which the vapors generated escape. Connected to the receptacle 1 near the bottom thereof is an outlet 4 to carry off concentrated liquid resulting from the vaporizing process. The receptacle 1 may, preferably, be provided with means to maintain the liquid contained therein at a predetermined level, as by a float valve. Rotatably mounted inside the receptacle 1 is a hollow heating element 5 formed with hollow journals 6 and 7 also serving as inlet and outlet, respectively, for the heating medium to be used for raising the temperature of element 5. The journal 7 carries a pulley 8 by which power is imparted to the journal 7 to rotate the element 5. The receptacle 1 further contains a rotary wing-wheel 9 and a stationary wing 10 the edge of which is in close proximity to the surface of the heating element. The vapor outlet 3 of the receptacle 1 is provided with a pressure reducing valve 11 and is connected to a separator 12 adapted to remove particles of liquid from the vapors. The separator is provided with a return pipe 13 to carry back liquid separated from the vapors to the receptacle 1, and is further provided with a vapor outlet 14 connected by a branch pipe 15 to an ejector 16. The ejector 16 is formed with a vapor or gas inlet 17 at its top and is connected at its bottom to the hollow journal 6.

The operation of the apparatus described is as follows:

The liquid to be vaporized or converted into steam is supplied to the receptacle 1 through the inlet pipe 2 and is maintained at a predetermined level. The heating element 5 is rotated at a suitable velocity and is heated by passing steam or another heating medium therethrough. In an actual test made with an apparatus in vaporizing a liquid which leaves a great deal of incrustations when evaporated in apparatus of a type hitherto commonly used a peripheral velocity of the wall of the heating elements amounting to 2–3 meters per second has proved entirely sufficient to prevent the production of incrustations on said wall. It may be, of course, that the velocity is insufficient in regard to other liquids and it is, on the other hand, also possible that even a lower velocity may be sufficient in certain cases. The wing 10 tends to prevent the liquid from rotating with the element 5, while the wing wheel 9 will improve the contact between the liquid and the heating element and thus also the vaporizing process while at the same time preventing the steam bubbles generated adjacent the heating element from adhering to the wall thereof to thereby form an insulating cover around the heating element, which would reduce the heat transmission. The vapor or steam generated in the receptacle 1 is led through pipe 3 and valve 11 to the separator 12 where particles of liquid that may be carried by the vapor or steam are removed and returned to the receptacle 1 through the pipe 13, while the purified vapor or steam escapes through pipe 14. The vapor or steam may now either be carried away for use at another place or compressed to a higher pressure and temperature and again supplied to the heating element as heating medium. This compression is effected in the embodiment shown in Figs. 1 and 2 by means of the ejector 16 which is operated in such case by high pressure steam supplied through pipe 17.

In certain cases it may be possible and desirable to pass hot combustion gases through the rotary heating element or provide for direct combustion within the same. This is especially of importance in cases where the apparatus according to this invention is used as a steam generator or as a vaporizer and the purpose of the vaporization is to recover the solid substances contained in the liquid.

The invention is particularly adapted for use in vaporization of waste liquors obtained in the manufacture of cellulose, that is, both sulphate and sulphite liquor. In both of said kinds of solutions certain of the constituents of the dry substance of the wood, as lignine and the cellulose types of carbohydrates are dissolved in the watery solution. Said ingredients, when absolutely dry and in a pulverous state, are of a heat value amounting to somewhat more than 4000 calories pr. kg. but are not at all easy to ignite. It is evident that if such a solution be evaporated to a suitable degree of concentration but yet of such a water content as to remain in liquid state, it may be used as a fuel, either alone or mixed with another fuel. In the said last-mentioned case the evaporation, of course, need not be extended very much. The waste liquors above referred to contains substances which will produce heavy incrustations when evaporated (boiled) in well known apparatus, while when treated in the apparatus according to this invention, the production of such incrustations is positively prevented.

However, according to this invention it is not intended, nor possible, to extend the vaporization beyond the point at which the solution is maintained in liquid state within the apparatus to the end of the evaporating process.

Figs. 3 and 4 of the drawing show diagrammatically one embodiment of the invention as adapted for internal combustion within the rotary heating element or elements. Mounted within the vaporizing receptacle 21 are three rotary heating elements 22, 23 and 24, rotated as by a gearing 25. The liquid or gaseous fuel is supplied to the rotary heating elements, preferably together with compressed air, through nozzles 26 of any appropriate kind. Said nozzles are each placed within one of the hollow journals of the respective heating elements, the combustion gases escaping through the other hollow journal of each heating element. The fuel may, if desired, consist of the liquid vaporized to the conccentration desired and mixed, if necessary, with another kind of fuel.

It should be noted that the number of the heating elements within the same receptacle, the shape of said elements, and the direction of the axes of rotation thereof may be choosen arbitrarily.

It should further be noted that the combustion may also be effected outside the vaporizing apparatus, as in a furnace or the like, and the resulting combustion gases passed through the rotary heating element or elements.

What I claim is:—

1. A method of evaporating liquids, which comprises enclosing the material to be evaporated in the space between a rotary heating element and a surrounding receptacle so that said element is substantially wholly immersed in the liquid, heating said rotary element directly by means of hot combustion gases, and rotating said heating element at a sufficient velocity relatively to said liquid to substantially prevent the production of crust upon the surface of said heating element.

2. A method of evaporating liquids containing combustible constituents, which comprises enclosing the material to be evaporated into the space between a rotary heating element and a surrounding receptacle, so that said element is substantially wholly immersed in the liquid, heating said rotary element directly by means of hot combustion gases obtained by burning said combustible constituents and rotating said heating element at a sufficient velocity relatively to said liquid to substantially prevent the production of crust upon the surface of said heating element.

3. A method of evaporating liquids, which comprises enclosing the material to be evaporated into the space between a rotary heating element and a surrounding receptacle, so that said element is substantially wholly immersed in the liquid, heating said rotary element directly by means of hot combustion gases, rotating said heating element at a sufficient velocity relatively to said liquid to substantially prevent the production of crust upon the surface of heating element, and preventing the liquid from partaking in said rotation.

4. An apparatus for evaporating liquids, which comprises a receptacle adapted to be substantially filled with the liquid to be evaporated a rotary heating means within said receptacle, and means within said receptacle, to prevent the liquid from rotation with the rotary heating means to stir up the liquid and to assist in removing the vapors generated on the surface of the heating means.

In testimony whereof I have signed my name.

GUSTAV BOJNER.